(12) United States Patent
Tate et al.

(10) Patent No.: US 12,466,523 B1
(45) Date of Patent: Nov. 11, 2025

(54) MARINE NAVIGATION SYSTEMS, METHODS, AND USER INTERFACES

(71) Applicant: Brunswick Corporation, Mettawa, IL (US)

(72) Inventors: Brandon L. Tate, Walnut Hill, IL (US); Jason S. Arbuckle, Horicon, WI (US)

(73) Assignee: Brunswick Corporation, Mettawa, IL (US)

( * ) Notice: Subject to any disclaimer, the term of this patent is extended or adjusted under 35 U.S.C. 154(b) by 161 days.

(21) Appl. No.: 18/520,049

(22) Filed: Nov. 27, 2023

(51) Int. Cl.
  *B63B 49/00* (2006.01)
  *B63B 43/18* (2006.01)
  *B63B 35/00* (2020.01)

(52) U.S. Cl.
  CPC .............. *B63B 49/00* (2013.01); *B63B 43/18* (2013.01); *B63B 2035/007* (2013.01)

(58) Field of Classification Search
  CPC .... B63B 49/00; B63B 43/18; B63B 2035/007
  See application file for complete search history.

(56) References Cited

U.S. PATENT DOCUMENTS

| | | |
|---|---|---|
| 7,561,886 B1 | 7/2009 | Gonring et al. |
| 9,255,807 B2 | 2/2016 | Lee et al. |
| 10,198,005 B2 | 2/2019 | Arbuckle et al. |
| 10,460,484 B2 | 10/2019 | Hovland et al. |
| 11,022,442 B1 * | 6/2021 | Paskaris et al. |
| 11,257,378 B2 | 2/2022 | Derginer et al. |
| 11,403,955 B2 | 8/2022 | Derginer et al. |
| 11,473,914 B2 | 10/2022 | Yamabayashi et al. |
| 11,531,343 B1 | 12/2022 | Kitchens et al. |
| 2019/0155287 A1 * | 5/2019 | Arbuckle ................. G08G 3/02 |
| 2020/0132467 A1 | 4/2020 | Borovac et al. |
| 2023/0195118 A1 * | 6/2023 | Singh ...................... B63B 79/15 701/21 |

* cited by examiner

*Primary Examiner* — Rodney A Butler
(74) *Attorney, Agent, or Firm* — Andrus Intellectual Property Law, LLP

(57) ABSTRACT

A method of controlling navigation for a marine vessel includes receiving a user input via a user input device identifying at least one selectable priority for path planning, defining a prioritized navigation pathway through a marine navigation area based on the at least one selectable priority for path planning indicated by the user input between a vessel location and a navigation target location, generating a display image representing the marine navigation area and the prioritized navigation pathway, and displaying the display image on a display device.

23 Claims, 9 Drawing Sheets

MARINE NAVIGATION SYSTEMS, METHODS, AND USER INTERFACES

FIELD

The present disclosure generally relates to systems and methods of facilitating user input and/or controlling navigation for a marine vessel, including systems and methods configured to path plan through marine environments.

BACKGROUND

The following U.S. Patents and publications provide background information and are incorporated herein by reference, each in its entirety:

U.S. Pat. No. 7,561,886 discloses a method by which a position of a marine vessel can be determined relative to a stationary object, such as a dock. Two position sensors are attached to a marine vessel and a microprocessor, onboard the marine vessel, computes various distances and angular relationships between the position sensors on the marine vessel and stationary transponders attached to the fixed device, such as a dock. The various dimensions and angular relationships allow a complete determination regarding the location and attitude of a marine vessel relative to the dock. This information can then be used by a maneuvering program to cause the marine vessel to be berthed at a position proximate the dock.

U.S. Pat. No. 11,257,378 discloses a method of controlling a propulsion system on a marine vessel that includes receiving proximity measurements describing locations of one or more objects with respect to the marine vessel, receiving a command vector instructing magnitude and direction for propulsion of the marine vessel with respect to a point of navigation for the marine vessel, and then determining a funnel boundary based on the command vector. An object is identified based on the proximity measurements and determined to be within the funnel boundary, and then a propulsion adjustment command is calculated based on the command vector and an angle of the object with respect to the point of navigation. At least one propulsion device is then controlled based on the propulsion adjustment command in order to avoid the object.

U.S. Pat. No. 11,403,955 discloses a propulsion control system on a marine vessel that includes at least one propulsion device configured to propel the marine vessel and at least one proximity sensor system configured to generate proximity measurements describing a proximity of an object with respect to the marine vessel. The system further includes a controller configured to receive proximity measurements, access a preset buffer distance, and calculate a velocity limit in a direction of the object for the marine vessel based on the proximity measurements and the preset buffer distance so as to progressively decrease the velocity limit as the marine vessel approaches the preset buffer distance from the object.

U.S. Patent Publication No. 2020/0132467 discloses a method of generating a chart for navigation through an open environment. The method includes retrieving a navigation chart from a navigation database, determining barriers in the navigation chart, generating first navigation nodes at a predetermined distance from the barriers, and generating second navigation nodes disposed within a first threshold distance range. The first threshold distance range includes a minimum distance from the barriers that is greater than the first predetermined distance. The method also includes generating first potential route segments (PRSs) that each extend between two first navigation nodes or between a first navigation node and a second navigation node that are within a first proximity distance of each other. The method further includes generating second PRSs that each extend between two second navigation nodes that are within a second proximity distance of each other.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one aspect of the disclosure, a method of controlling navigation for a marine vessel includes receiving a user input via a user input device identifying at least one selectable priority for path planning, defining a prioritized navigation pathway through a marine navigation area based on the at least one selectable priority for path planning indicated by the user input between a vessel location and a navigation target location, generating a display image representing the marine navigation area and the prioritized navigation pathway, and displaying the display image on a display device.

In one embodiment, the at least one selectable priority for path planning includes an acceleration maximum, wherein the acceleration maximum defines an acceleration limit of the marine vessel and/or at least one marine drive on the marine vessel, and the prioritized navigation pathway is defined such that the acceleration maximum is not exceeded.

In another embodiment, the at least one selectable priority for path planning includes a distance from obstacles, wherein the prioritized navigation pathway is defined such that the vessel remains at least a threshold distance from any obstacle. In another embodiment, the user input specifies the threshold distance.

In another embodiment, wherein the at least one selectable priority for path planning includes minimizing travel time, wherein the prioritized navigation pathway is defined to minimize the time it takes to travel between the vessel location and the navigation target location.

In another embodiment, the at least one selectable priority for path planning includes energy efficiency, wherein the prioritized navigation pathway is defined to prioritize energy efficiency of at least one marine drive while propelling the vessel between the vessel location and the navigation target location.

In another embodiment, the method includes, upon generating the display image and displaying the display image on the display device, prompting a user to confirm the prioritized navigation pathway or select at least one additional selectable priority for path planning.

In another embodiment, the user input identifies two or more selectable priorities for path planning. In another embodiment, the two or more selectable factors are prioritized and the prioritized navigation pathway is defined based on the prioritization of the two or more selectable priorities for path planning.

In another embodiment, the method includes defining a first navigation pathway through the marine navigation area between the vessel location and the navigation target location, wherein the first navigation pathway includes a first set of geographical locations extending in a first direction from the vessel location towards the navigation target location, generating a first display image representing the marine navigation area and the first navigation pathway and displaying the first display image on the display device, and wherein the at least one selectable priority for path planning inputted by a user indicates a different direction than the first direction such that the new navigation pathway extends in a different direction with respect to the vessel location than the first direction.

In another aspect of the disclosure, a docking system includes a display device and a control system. The control system is configured to receive a user input via a user input device identifying at least one selectable priority for path planning, define a prioritized navigation pathway through a marine navigation area based on the at least one selectable priority for path planning indicated by the user input between a vessel location and a navigation target location, generate a display image representing the marine navigation area and the prioritized navigation pathway, and display the display image on the display device.

In one embodiment, the at least one selectable priority for path planning includes an acceleration maximum, wherein the acceleration maximum defines an acceleration limit of the marine vessel and/or at least one marine drive on the marine vessel, and the prioritized navigation pathway is defined such that the acceleration maximum is not exceeded.

In another embodiment, the at least one selectable priority for path planning includes a distance from obstacles, wherein the prioritized navigation pathway is defined such that the vessel remains at least a threshold distance from any obstacle. In another embodiment, the user input specifies the threshold distance.

In another embodiment, wherein the at least one selectable priority for path planning includes minimizing travel time, wherein the prioritized navigation pathway is defined to minimize the time it takes to travel between the vessel location and the navigation target location.

In another embodiment, the at least one selectable priority for path planning includes energy efficiency, wherein the prioritized navigation pathway is defined to prioritize energy efficiency of at least one marine drive while propelling the vessel between the vessel location and the navigation target location.

In another embodiment, the control system is configured to, upon generating the display image and displaying the display image on the display device, prompt a user to confirm the prioritized navigation pathway or select at least one additional selectable priority for path planning.

In another embodiment, the user input identifies two or more selectable priorities for path planning. In another embodiment, the two or more selectable factors are prioritized and the prioritized navigation pathway is defined based on the prioritization of the two or more selectable priorities for path planning.

In another embodiment, the control system is configured to define a first navigation pathway through the marine navigation area between the vessel location and the navigation target location, wherein the first navigation pathway includes a first set of geographical locations extending in a first direction from the vessel location towards the navigation target location, generate a first display image representing the marine navigation area and the first navigation pathway and displaying the first display image on the display device, and wherein the at least one selectable priority for path planning inputted by a user indicates a different direction than the first direction such that the new navigation pathway extends in a different direction with respect to the vessel location than the first direction.

BRIEF DESCRIPTION OF THE DRAWINGS

The present disclosure includes the following Figures.

DETAILED DESCRIPTION

Figure 1:
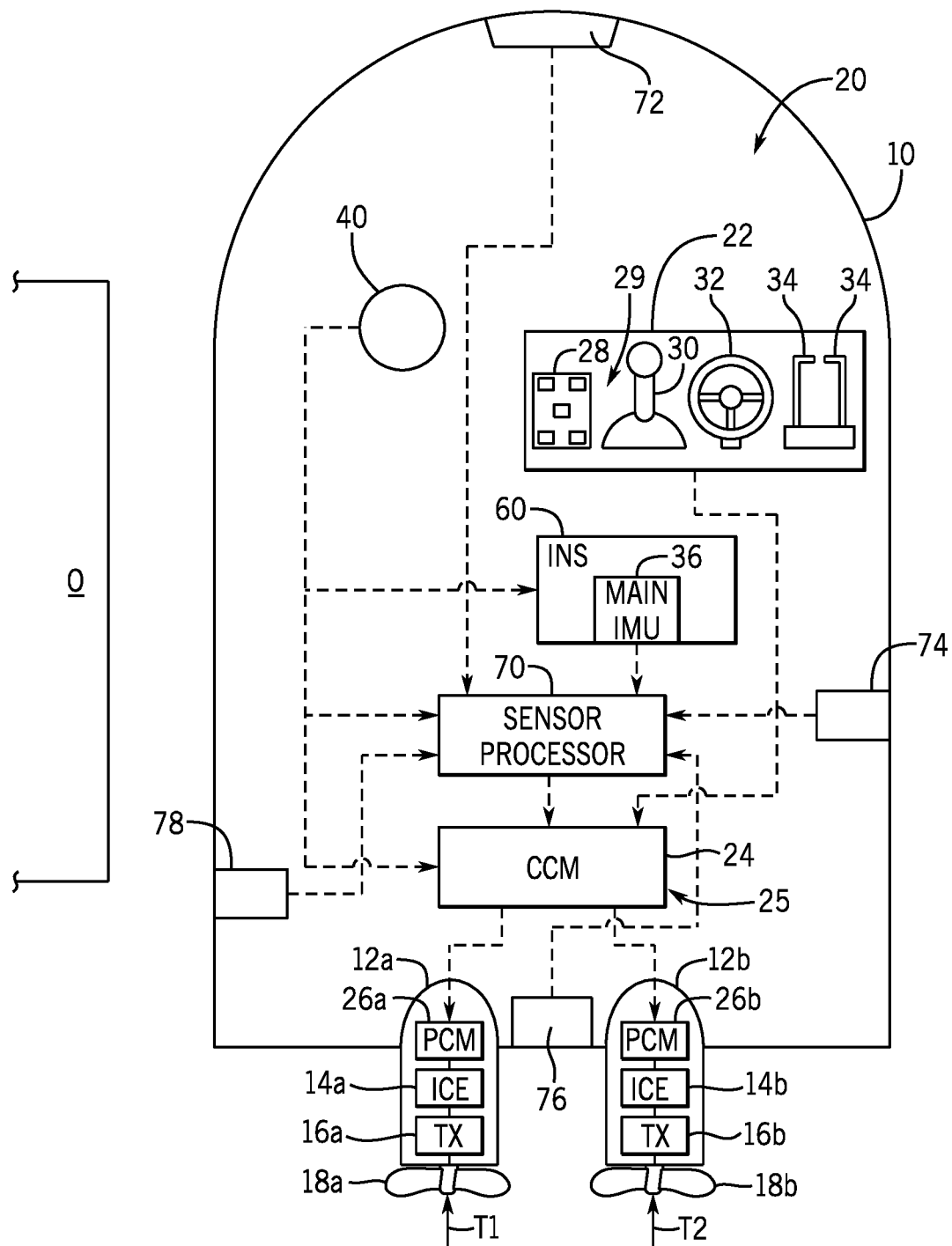
FIG. 1 is a schematic representation of an exemplary propulsion system on a marine vessel according to one embodiment of the present disclosure.

The present disclosure relates to facilitating user input for controlling navigation for a marine vessel, including systems and methods configured to path plan through marine environments. The inventors have recognized that user interface systems and methods for docking and path planning need to be easy for an operator to use while prioritizing user preferences in the output of a navigation system. Furthermore, the inventors recognized the likelihood of a user having several preferences and the need to prioritize and/or rank between those preferences.

Moreover, prioritizing user preferences for path planning in marine navigation is complicated by the multiple axes of vessel movement, lack of precision control over vessel position and movement, and relative unconstrained navigation options compared to typical automotive navigation. Marine navigation is relatively unconstrained compared to navigation on established land roadways because waterways typically permit vessels to navigate in any direction and permit vessels to occupy anywhere on the waterway and travel in any direction that they are physically able to travel. Moreover, many marine vessels (such as those equipped with joystick piloting) are capable of effectuating movement in any direction on the water, including sideways motion and turning in place. Thus, there are typically innumerable possible pathways for navigating a vessel through a marine environment.

Existing solutions for defining navigation pathways include methods of using an auto heading and/or auto piloting, such as based on perception sensors and systems and/or GPS tracking. These navigation methods plan a path for the marine vessel to reach the navigation target location, but such paths are often imperfect and/or do not meet a user's navigation preferences. The inventors have recognized that current marine navigation systems and interfaces do not offer user interfaces that enable intuitive or easy user adjustment of a navigation path, including prioritizing a specific form of navigational performance, such as energy efficiency or minimizing time to target, or both, and thus improved user interfaces are needed that are tailored to account for the user's preferences and the particularities of marine navigation.

Given those challenges, the inventors developed the disclosed system to provide driver assistance and/or automated control functionality to facilitate prioritized path planning user input and define a prioritized navigation pathway between a start location of the marine vessel and a navigation target location. The inventors have devised systems and vessel control methods providing a user interface that facilitates user input identifying one or more selected priorities for path planning. The control system is configured to then define and display a prioritized navigation pathway based on user's prioritization input.

In one embodiment, a user interface display provides a plurality of selectable priorities on a display device that correlate with navigational actions directed by the control system to define the prioritized navigation pathway. Selectable priorities for navigation may include, for example, shortest distance, minimizing time to target, energy efficiency, acceleration maximum or other comfort parameter, clearance distance, or density avoidance. Whereas these various factors may be competing in most scenarios, the disclosed system is configured to allow the user to select which factor(s) are to be prioritized by the path planner and the path planner is configured to weight each factor based on the user inputs.

Thereafter, the control system may prompt the user to either confirm the prioritized navigation pathway or select an additional selectable priority for path planning. Upon receiving user input finalizing the prioritized navigation pathway, the prioritized navigation pathway is set as the path for the marine vessel to travel and the propulsion system on the marine vessel will be automatically controlled to navigate toward the target location, such as for autonomous or semi-autonomous docking control.

FIG. 1 shows a marine vessel 10 equipped with a propulsion system 20 configured according to one embodiment of the disclosure. The propulsion system 20 is capable of operating, for example, in a joysticking mode where a joystick is operated by an operator to control vessel movement within an x/y plane, among other modes, as described hereinbelow. The propulsion system 20 has first and second marine drives 12a, 12b that produce first and second thrusts T1, T2 to propel the vessel 10. The first and second marine drives 12a, 12b are illustrated as outboard motors, but they could alternatively be inboard motors, stern drives, jet drives, or pod drives. In one embodiment, each marine drive 12a, 12b is provided with a powerhead, such as an engine 14a, 14b, operatively connected to a transmission 16a, 16b, in turn, operatively connected to a propeller 18a, 18b. In other embodiments, the powerhead may be an electric motor (e.g., powered by a battery or other power storage system) or a hybrid system comprising one or more of an electric motor and an internal combustion engine configured to initiate rotation of the propeller 18a, 18b.

The vessel 10 also houses various control elements that comprise part of the control system 25 for the propulsion system 20. The control system 25 comprises one or more controllers communicatively connected, and an operation console 22 in signal communication therewith, for example via a communication bus such as a CAN bus arrangement as described in U.S. Pat. No. 6,273,771. The one or more controllers of the control system 25 may comprise multiple hardware control devices communicatively connected, each including a hardware processor, such as for example a central controller 24 (e.g., shown as a command control module (CCM)) and/or propulsion control modules (PCM) 26a, 26b associated with the respective marine drives 12a, 12b. Each controller in the control system 25, such as controller 24 and the PCMs 26a, 26b, may include a memory and a programmable processor. As is conventional, each controller 24, 26a, 26b includes a processor communicatively connected to a storage system comprising a computer-readable medium that includes volatile or nonvolatile memory upon which computer-readable code and data are stored. The processor can access the computer-readable code and, upon executing the code, carry out functions, such as the navigation control functions and/or the proximity sensing functions, as described in detail below.

The control system 25 may further include one or more sensor processors 70, such as image processors configured to process the image data from the one or more image sensors 72-78. In one embodiment, an imaging system may include the one or more image sensors 72-78 and image processors and be configured to image an area around the marine vessel 10 to generate image data that the control system may use to generate the display representing the marine navigation area on the user interface. Alternatively or additionally, the display representing the marine navigation area may be based on a global position measurement of the marine vessel 10 and/or chart data stored in memory. In one embodiment, the control system may define the regions of the display based on a grid system that utilizes a spatial plane, such as defined according to a known geographic coordinate system (e.g., GPS coordinates). Alternatively or additionally, the imaging system may capture measurements of distance from the marine vessel 10. The control system may generate a grid system of equivalents that correlate measurements determined from received image data to a proportional representation on the display.

Given the large amount of image data produced by the image sensors 72-78, the connection between the sensors 72-78 and the sensor processor 70 may be via a dedicated bus or network connection. This dedicated bus or network connection is separate from the vessel network to allow transmission of a large amount of proximity measurement data (and, in some embodiments, IMU data) to the sensor processor 70. Such data transmission may not be possible on a typical vessel network, such as a CAN bus or wireless network where multiple devices are communicating. In still other embodiments, a dedicated communication link may be provided between the sensor processor 70 and the propulsion controller, such as the central controller 24.

The operation console 22 includes a number of user input devices, such as a keypad 28, a joystick 30, a steering wheel 32, and one or more throttle/shift levers 34. The operation console 22 may further include an operation console display device 29, such as may be associated with an onboard management system and/or a user interface, that is configured to visually present information to the operator (e.g., information regarding control mode, control settings, tie-off displays, suggested tie-off patterns, available docking locations, and docking optimization instructions), present control options to the operator, and receive user input from the operator in response to the control options. One example of such a display system thes Vessel View® by Mercury Marine Company of Fond du Lac, Wisconsin. The operation console 22 and user interface system may further include one or more mobile devices not positioned at the helm of the vessel, such as a user's mobile device communicating with the control system 25 via an application, such as via VesselView Mobile® by Mercury Marine. Each of these devices inputs commands to the control system 25. Controllers 24 within the control system 25, in turn, communicate control instructions to the first and second marine drives 12a, 12b by communicating with the PCMs 26a, 26b.

The propulsion system 20 also includes one or more image sensors 72, 74, 76, and 78. Although one proximity sensor is shown on each of the bow, stern, port and starboard sides of the vessel 10, fewer or more sensors could be provided at each location and/or provided at other locations, such as on the hardtop of the vessel 10. The image sensors 72-78 include visual light sensors, distance sensors, and/or directional sensors configured to generate image data. For example, each of the image sensors 72-78 may be any one of a radar sensor, sonar sensor, standard visual light camera, stereovision camera or other camera configured to measure depth information, laser sensor (e.g. lidar or Leddar), Doppler direction finder, or other devices individually capable of determining both the distance and direction (at least approximately), i.e. the relative position of an object O with respect to the vessel 10, such as a dock, a seawall, a piling, another vessel, etc. The sensors 72-78 provide information regarding both a direction of the object with respect to the marine vessel 10 and the shortest distance between object O and the vessel 10.

Regarding the image sensors 72, 74, 76, 78, note that different types of sensors may be used depending on the distance between the vessel 10 and the object O and/or its relative direction to the vessel 10. For example, radar sensors may be used to detect objects at further distances. Once the vessel 10 comes within a particular distance of the object, lidar, ultrasonic, Leddar, or sonar sensors may instead be used. Camera sensors (such as including one or more stereovision cameras) may be used, alone or in combination with any of the sensors mentioned above, in order to provide object proximity information to the CCM 24. Sensors are placed at positions on the vessel 10 so that they are at the correct height and facing direction to detect objects the vessel 10 is likely to encounter. Optimal sensor positions will vary depending on vessel size and configuration.

The image sensors are positioned at each of the front, sides, and stern of the vessel 10, and include front-facing sensor 72, starboard-facing sensor 74, rear-facing sensor 76, and port-facing sensor 78. In a different exemplary sensor arrangement, two image sensors may be placed on the hard top of the marine vessel 10 and arranged such that the fields of view of the two sensors, combined, cover the entire 360° area surrounding the vessel 10. Note also that the relevant controller, such as the sensor processor 70, may selectively operate any one or more of a plurality of sensors (including radars, lidars, Leddars, ultrasonics, and/or visual light cameras) to sense the shortest distance and the direction of the object with respect to the vessel 10. Alternatively, the sensor processor may use all available sensor data from all sensor types, which may be reviewed real-time as it is received or may be formulated into one or more maps or occupancy grids integrating all proximity measurement data, where the mapped data from all the operated sensors is processed as described herein. In such an embodiment, the proximity measurements and other information from the image data from each of the various sensors are all translated into a common reference frame, such as represented in a point cloud, occupancy grid, or other map of the environment. In one embodiment, the control system is configured to correlate these maps or occupancy grids with a grid of the display and/or with one or more selectable locations on the display of the marine navigation area.

Autonomous and/or advanced operator assistance (i.e., semi-autonomous) controls for improved vessel handling qualities require the placement of multiple image sensors on the vessel 10. In general, these various types of proximity sensing devices (examples described above) are positioned to detect the presence of objects in the marine environment surrounding the marine vessel 10, such as a dock, swimmer, or other obstruction in the path of the vessel. Each sensor reports proximity relative to its own frame of reference—i.e., the distance from the sensor to the object as measured along the view angle of the sensor. Depending on the type of sensor, the application of use, boat size, hull shape, etc., multiple sensor types and sensor locations may be required to provide adequate proximity sensing around the marine vessel 10 for operation in all marine environments. To create a cohesive dataset that can be used for purposes of vessel control and vessel navigation, including autonomous vessel navigation and semi-autonomous control (such as automatic maneuver-limiting control), all of the data sources are preferably translated to a common reference frame. This requires precise knowledge of the location and orientation of each sensor relative to the common reference frame such that the data measured therefrom can be translated appropriately.

In the example of FIG. 1, an inertial measurement unit (IMU) 36 is installed at a known location on the marine vessel with respect to a predefined point of navigation, such as the center of rotation (COR) or center of gravity (COG). The installation orientation or the IMU 36 is also known. The installation locations of the IMU 36 and each proximity sensor 72-78 are established as part of a calibration procedure for the proximity sensing system.

Referencing the example in FIG. 1, the IMU 36 may be part of an inertial navigation system (INS) such as including one or more micro-electro-mechanical systems (MEMS). For example, the INS 60 may consist of a MEMS angular rate sensor, such as a rate gyro, a MEMS accelerometer, and a magnetometer. Such INS systems are well known in the relevant art. In other embodiments, the motion and angular position (including pitch, roll, and yaw) may be sensed by a differently configured INS 60, or by an attitude heading reference system (AHRS) that provides 3D orientation of the marine vessel 10 by integrating gyroscopic measurements, accelerometer data, and magnetometer data.

The INS 60 receives orientation information from the IMU 36 and may also receive information from a GPS receiver 40 comprising part of a global positioning system (GPS). The GPS receiver 40 is located at a pre-selected fixed position on the vessel 10, which provides information related to global position of the marine vessel 10. The IMU 36 is also located at a known and fixed position with respect to the center of navigation determined for the marine vessel 10, such as the COR or COG. In one embodiment, the control system may visually represent the global position of the marine vessel 10 on the user interface display of the marine navigation area.

The control system may be configured to establish and maintain a buffer distance around the marine vessel, where the control authority provided to an operator is limited based on the buffer distance. For example, the control system 25 may continuously calculate a maximum velocity, or velocity limit, for the marine vessel as it approaches an object O, and may limit an operator's authority in controlling the propulsion of the marine vessel 10 such that the propulsion system will not effectuate a thrust that will cause the marine vessel to travel toward the object at a velocity that is greater than the velocity limit. Thus, the propulsion system does not respond to, or carry out, commands that would cause the vessel to violate the buffer distance and venture too close to an object. In certain embodiments, the propulsion control system may be configured to automatically maintain a predetermined buffer distance between the marine vessel 10 and an object O, such as to automatically effectuate propulsion controls to force the marine vessel 10 away from the object O when the buffer zone is violated.

Figure 2:
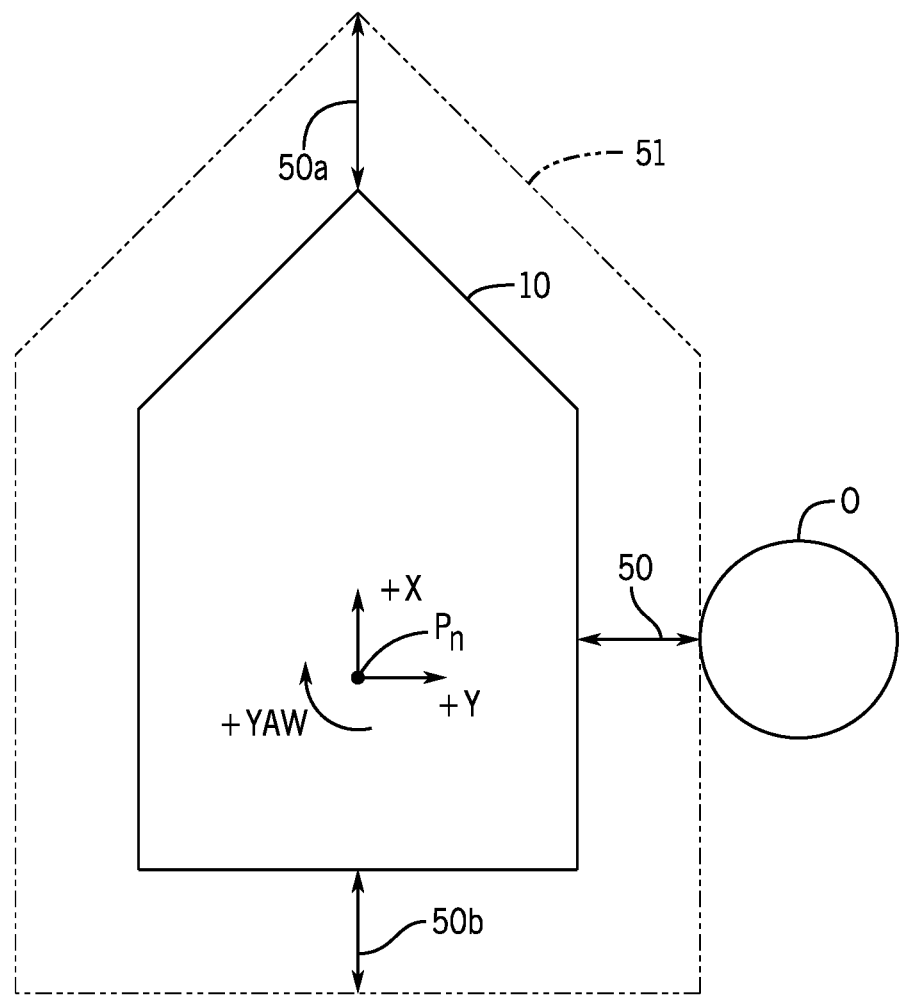
FIG. 2 schematically illustrates one implementation of a buffer distance maintained between a marine vessel and an object according to one embodiment of the present disclosure.

FIG. 2 is a diagram exemplifying this concept, where the marine vessel 10 is maintained at least the predetermined buffer distance 50 from the object O. A buffer zone 51 around the marine vessel 10 is defined, and velocity limits are calculated to progressively decrease the vessel velocity as it approaches the preset buffer distance 50 from the object O. In the depicted embodiment, the buffer zone 51 is established at a preset buffer distance 50 that is equal around all sides of the marine vessel. In certain embodiments, the buffer zone 51 may be asymmetrical with respect to the marine vessel, such as to provide a greater buffer distance 50a at the front side of the marine vessel than the buffer distance 50b on the rear side of the marine vessel. Similarly, a buffer distance on the starboard and port sides of the marine vessel 10 may be set the same or different than the front and rear buffer distances 50a, 50b.

Maintenance of the entire buffer zone is not always desired or practical, such as when the vessel is being docked and/or otherwise positioned to allow passengers to get on and off the marine vessel. Thus, the control system 25 may be configured to limit an operator's authority to control propulsion of the marine vessel in the direction of the object so as to provide a controlled approach and impact to an object, such as a dock. The control system 25 may be configured to modify or disable collision avoidance algorithms, such as the velocity limiting and autonomous buffer maintenance controls, upon receipt of a user-generated instruction to suspend the maintenance of the buffer distance from the object, such as the dock. In some embodiments, the control system remains responsive to user control inputs via a user input device, such as a joystick, to move the marine vessel in the direction of the object so as to provide a smooth and controlled impact between the marine vessel and the object, and/or to hold the marine vessel against the object, such as while passengers disembark. The user control, such as via the joystick 30, remains intuitive during the velocity-limited control modality. For example, the limited user input authority provided via the joystick may be implemented by rescaling and/or offsetting the propulsion commands associated with the joystick positions.

In other embodiments, the control system 25 provides autonomous control of propulsion so as to navigate the marine vessel 10 in tight spaces, such as during docking and launch. The inventors have recognized that navigating and docking a marine vessel is a challenging task, especially with external factors common in marine environments, such as wind, waves, and current. Accordingly, the inventors have recognized that autonomous control may be beneficial for certain marine vessel control tasks, especially those tasks requiring high visibility at all points around the marine vessel and/or precise propulsion control. Accordingly, the control system 25 may be configured to execute steps included in navigating the prioritized navigation pathway to move the marine vessel safely to a navigation target location, which may be performed autonomously utilizing advanced closed-loop control in conjunction with image sensors at key points around the marine vessel.

The autonomous or semi-autonomous control algorithms, such as effectuated by the control system 25, include velocity control software performing algorithms to calculate a maximum velocity for the marine vessel 10 as it approaches an object O. Where propulsion control is based on user input, the control system 25 may calculate a maximum velocity for the vessel and effectuate velocity limits accordingly. In one embodiment, the velocity limits may be calculated based on a known maximum acceleration for the marine vessel. The maximum acceleration for the marine vessel may be based on the maximum vessel capabilities, such as the maximum positive or negative acceleration that can be effectuated by the propulsion system on the marine vessel 10 in the relevant direction of travel. Alternatively or additionally, the maximum acceleration for the marine vessel 10 may be predetermined and prioritized during navigation by selected priorities for path planning that may affect handling, comfort, and/or safety metrics.

Figure 3:
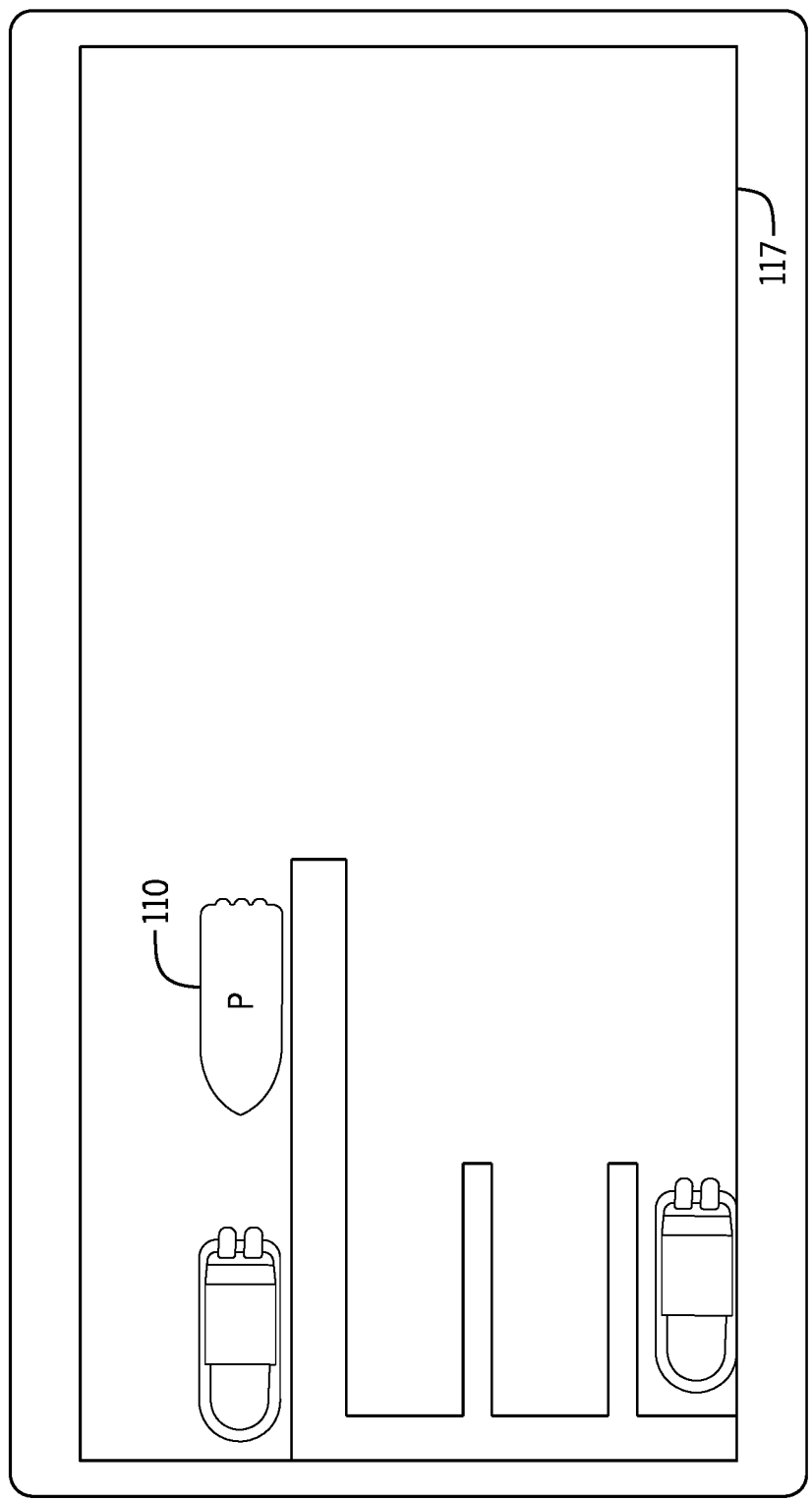
FIG. 3 illustrates a navigation target location within a marine navigation area according to one embodiment of the present disclosure.

In certain embodiments, the control system 25 may be configured to identify potential docking surfaces in the marine environment around the vessel 10 based on the proximity measurements 90 by the various image sensors 72-78. Referring now to FIG. 3, a navigation target location 110 within a marine navigation area is illustrated. In one embodiment, the navigation target location 110 may be a desired future location of the marine vessel within the marine navigation area. In one embodiment, the control system may present one or more selectable locations as options for navigation target locations 110. In another embodiment, the control system may access a stored buffer zone (from predetermined settings or an accessible database stored in memory) and account for any buffer distances when placing a navigation target location 110 and/or planning the prioritized navigation pathway to the navigation target location 110. The control system may place the navigation target location 110 as close to the geographic location correlated to the selected location on the display 117 as possible. In one embodiment, placement of the navigation target location 110 is determined by matching a known location such as such as the center of rotation (COR) or center of gravity (COG) to the closest geographical location associated with the selected location on the display.

Figure 4:
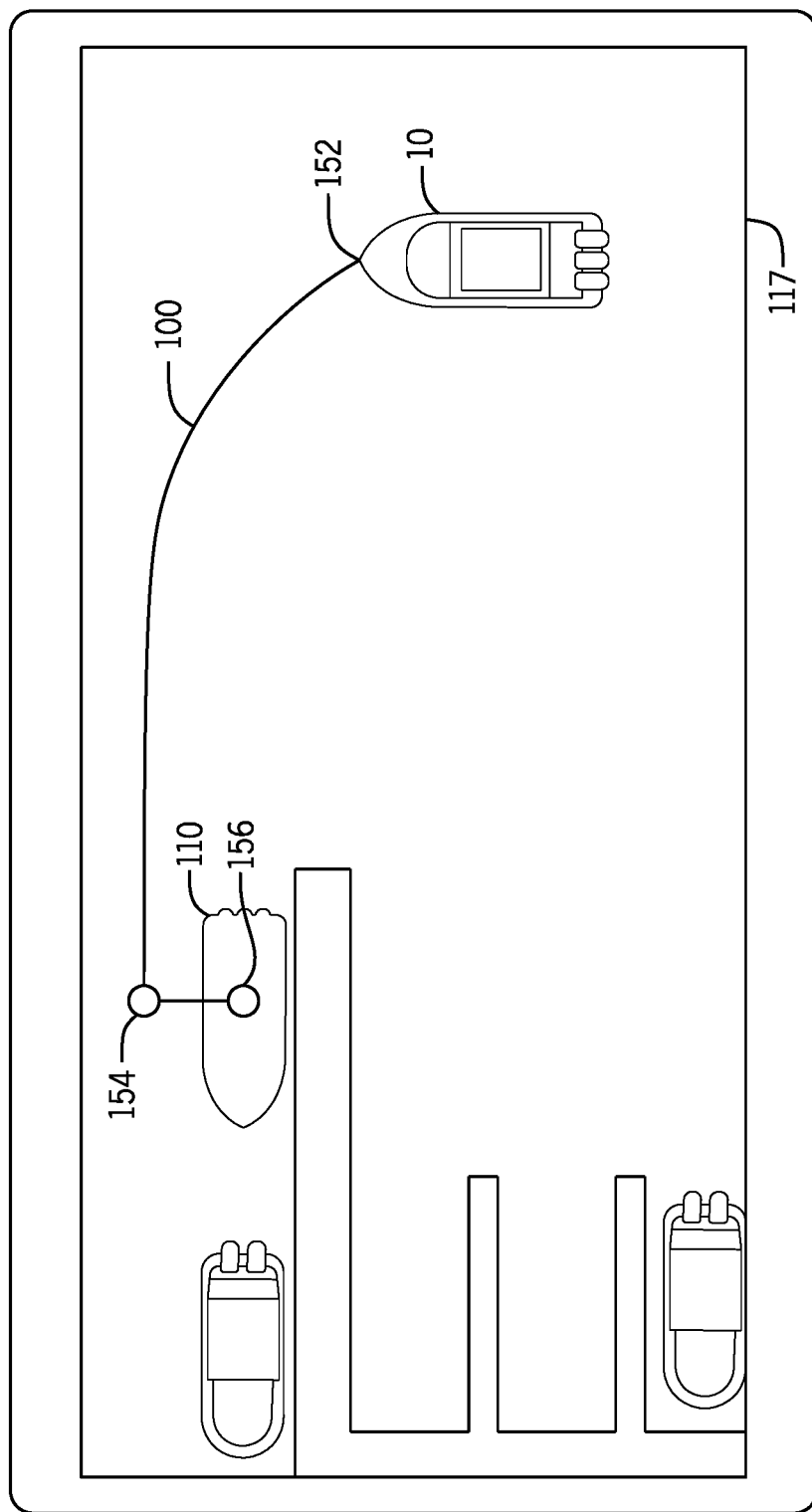
FIG. 4 is an exemplary display of a marine navigation area indicating a navigation target location and a first navigation pathway according to one embodiment of the present disclosure.

Referring now to FIG. 4, the control system may receive a global position measurement describing a global position of the marine vessel 10. The control system may define a first navigation pathway 100 through the marine navigation area between the global position of the marine vessel 10 and the navigation target location 110. In one embodiment, the first navigation pathway 100 may include a first set of geographical locations indicating the geographical location of the first navigation pathway 100. The control system may generate a display 117 on the user interface that represents the marine navigation area and the first navigation pathway 100. The first set of geographical locations defining the first navigation pathway 100 may include a start point 152 and/or an end point 156. The first navigation pathway 100 may include one or more turn points 154. At a turn point 154, the thrust direction may change, such as between surge and sway or surge and yaw as the marine vessel 10 navigates towards the navigation target location 100.

In one embodiment, the imaging system may image an area around the marine vessel 10 to generate image data. The control system may use this image data to determine the first navigation pathway and/or the prioritized navigation pathway described in FIG. 5. Similarly, the control system may generate the display image displayed on the display device representing the marine navigation area based on the image data. In another embodiment, the control system may identify at least one obstacle in the image data between the global position of the marine vessel 10 and the navigation target location 110 and define the first navigation pathway 100 as a pathway that avoids the identified obstacle. The control system may define the first navigation pathway 100 and/or the adjusted navigation pathway to maintain a predetermined distance from the identified obstacle, which may be an above-water obstacle or a below-water obstacle such as a shallow area.

In one embodiment, upon generating the display 117 representing the marine navigation area and the first navigation pathway 100 between the global position of the marine vessel 10 and the navigation target location 110, the control system may prompt a user to confirm or adjust the first navigation pathway 100. The presentation of the first navigation pathway 100 on the display 117 may allow the user to preview the first navigation pathway 100 before the marine vessel is in motion. Adjustments to the first navigation pathway 100 received by the control system may navigate the marine vessel around obstacles that the control system may not detect either through the imaging system, map data, and/or chart data, such as an underwater formation that may be undetected by a navigation system unpaired with a sonar or radar system.

In one embodiment, the navigation system may identify a first navigation pathway in conjunction with navigation tools and systems, such as waypoint navigation or autodocking. The control system may receive a command from a navigation tool, such as a selection of a navigation target location, and define a first navigation pathway 100 based on the received user input from the navigation tool. The control system may, upon identification of a navigation target location, define a first navigation pathway from the vessel location of the marine vessel to the navigation target location 110. In one embodiment, the first navigation pathway may be a prioritized navigation pathway defined by the control system based on one or more priorities for path planning, which may be one or more user-selected priorities, such as the most energy efficient, the shortest distance, or the shortest amount of travel time. Alternatively, the first navigation pathway may be generated based on predetermined settings for path generation, where user selection of path planning priorities are not accounted for. Where the user deems the first pathway suboptimal or inadequate, the user may input selection of one or more priorities for path planning to force the path planner to re-plan the pathway. Where the first pathway is a prioritized navigation pathway generated based on user-inputted priorities, the system may be configured to facilitate the user to change the priority selection to force pathway modification where the user deems the pathway suboptimal or inadequate.

Figure 5:
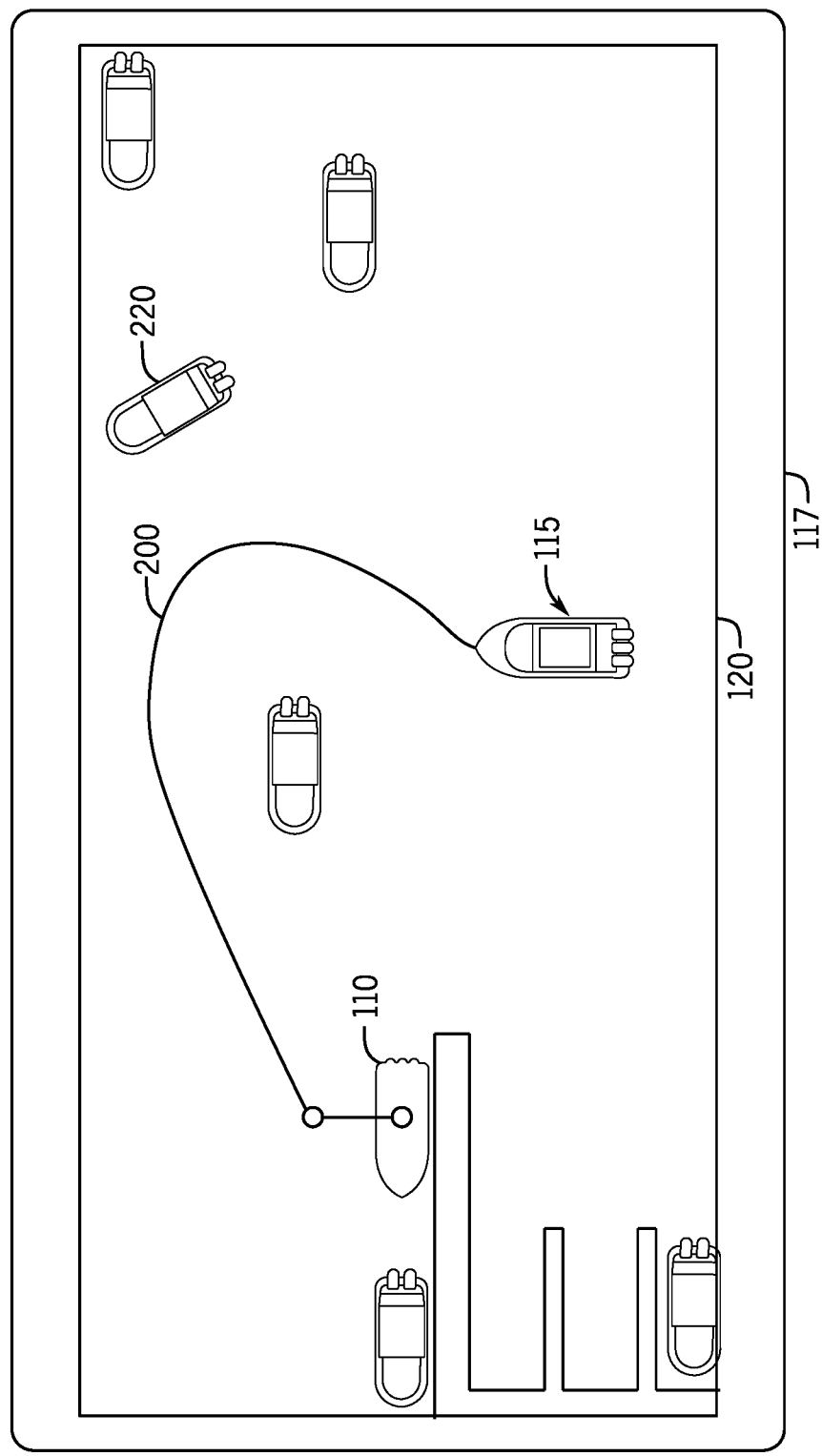
FIG. 5 is an exemplary display of a prioritized navigation pathway according to one embodiment of the present disclosure.

Referring now to FIG. 5, an exemplary display of a prioritized navigation pathway is illustrated. To define the prioritized navigation pathway 200, the control system may be configured to receive a user input, such as via a user input device, identifying at least one selectable priority for path planning. The user input indicates at least one selectable priority that the control system uses to define the prioritized navigation pathway 200 as a pathway through the marine navigation area, between a vessel location 115 (present or future) and a navigation target location 110.

In one embodiment, selectable priorities for path planning are presented on the user interface display 117 that each identifies one or more values that should be optimized when planning the navigation pathway. One selectable priority for path planning may include an acceleration maximum, wherein the acceleration maximum defines an acceleration limit of the marine vessel and/or at least one marine drive. The prioritized navigation pathway 200 is then defined such that the acceleration maximum is not exceeded. When an acceleration maximum is selected as a priority for path planning, the control system may define or modify the maneuvers defined for navigating the prioritized navigation pathway 200 and/or may generate or adjust the set of geographical locations that define the navigation pathway to be conducive to maintaining slow acceleration below the maximum. Thus, in implementations where there is a first navigation pathway and an acceleration maximum is selected as a priority for replanning a prioritized navigation pathway, the set of geographical locations associated with the first navigation pathway may stay the same, but the control system may adjust the planned output commands for the propulsion system so that acceleration is limited and/or the rate of turns is more gradual, as examples.

Figure 6A:
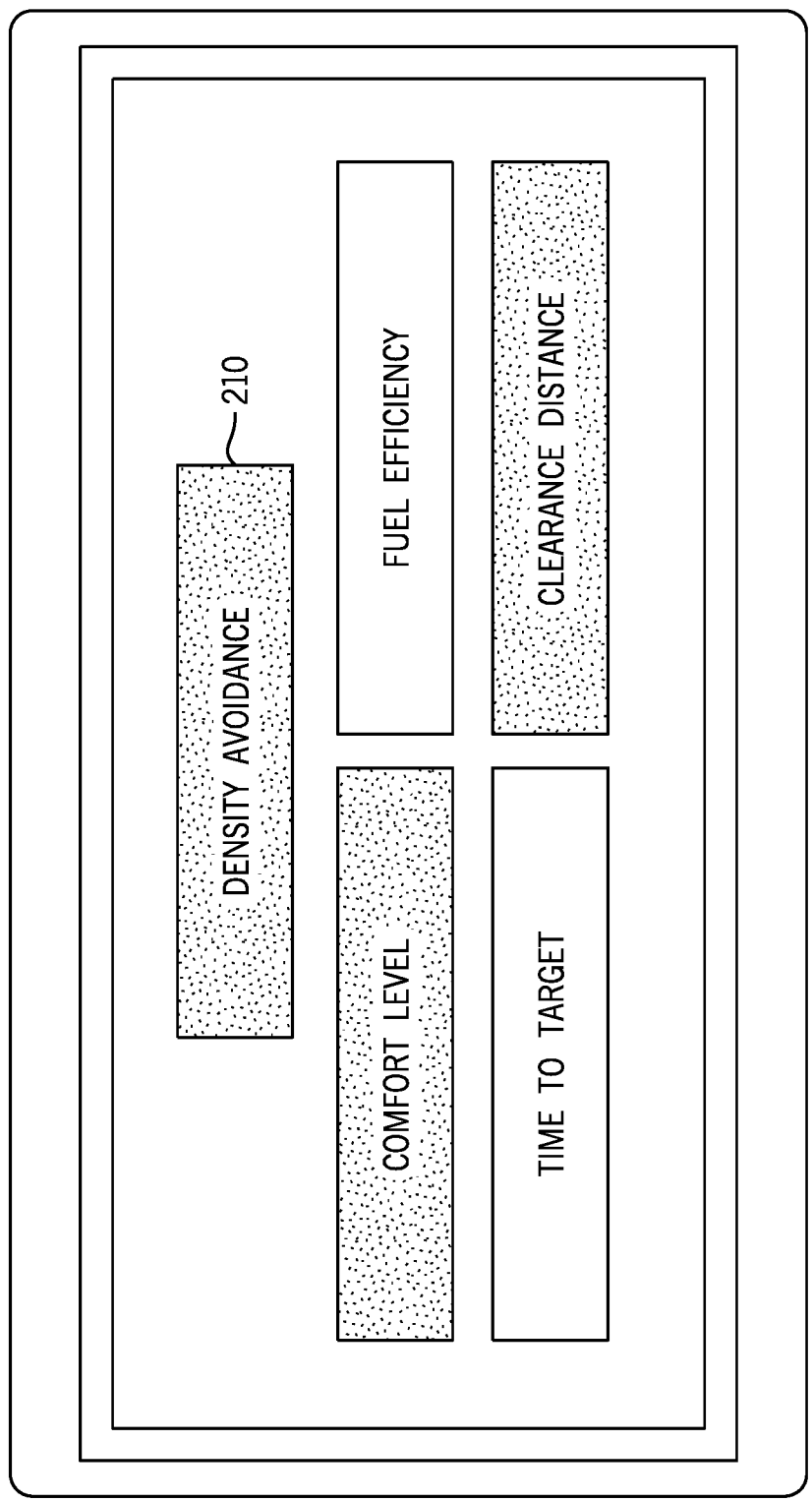
FIG. 6A-6B is an exemplary display of a plurality of selectable priorities for path planning according to one embodiment of the present disclosure.
Figure 6B:
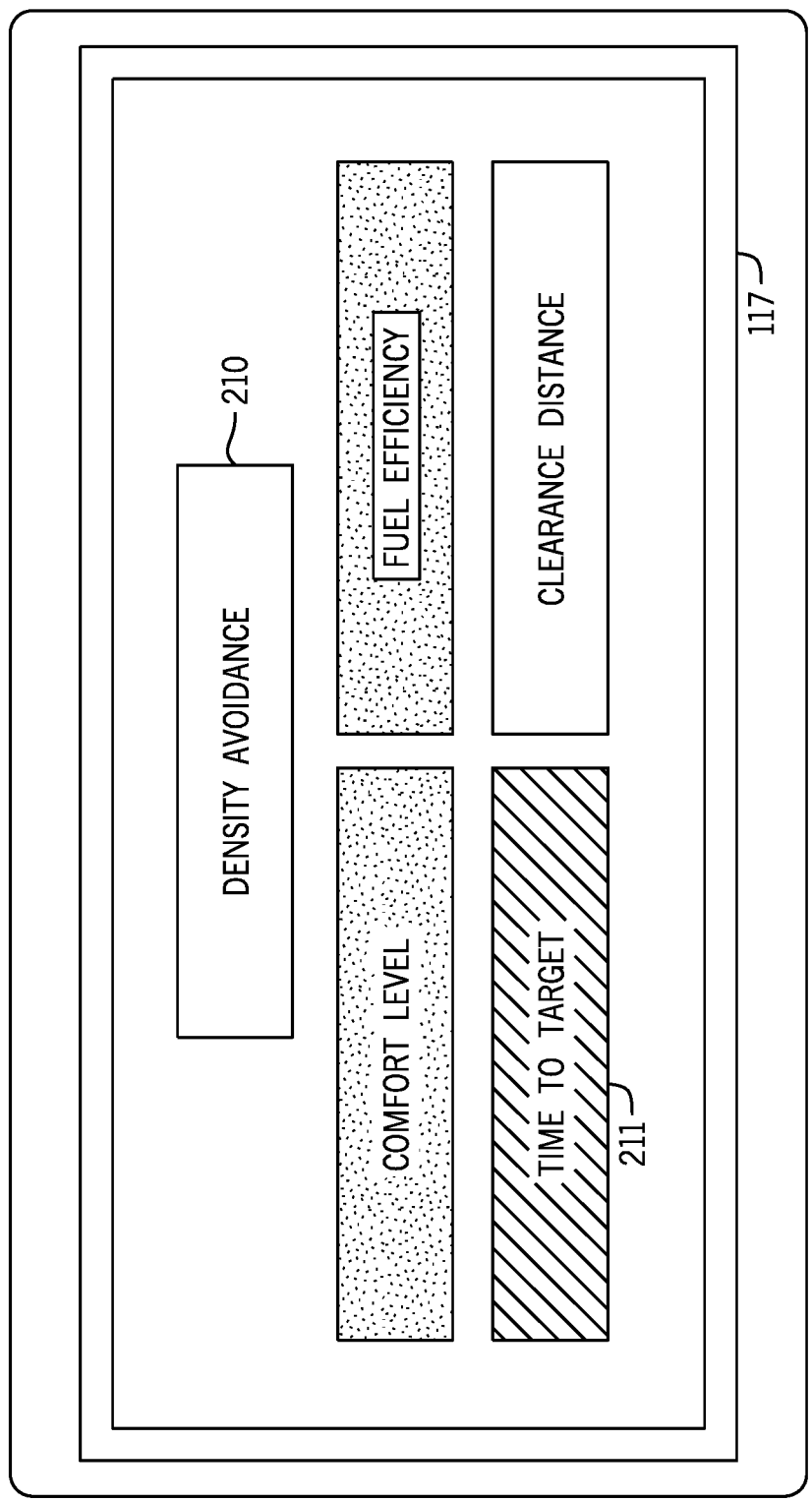

Another selectable priority for path planning may include a distance from obstacles, or clearance distance, wherein the prioritized navigation pathway 200 is defined such that the marine vessel remains, or more preferably remains, at least a threshold distance from any obstacle 220. In at least one embodiment, received user input may specify the threshold distance or may specify a relative distance (e.g., medium, long, extra long). Alternatively the system may be configured with a default threshold distance utilized when the clearance distance priority is selected and which is larger than the buffer distance that the path planner would otherwise use if the clearance distance priority were not selected. The distance from obstacles 220 may be effectuated by the path planner in various ways, such as increasing the buffer zone or the size of the obstacle 220 for the path planning algorithm to generate a pathway that maintains at least the threshold distance between the marine vessel and any obstacle 220. The distance from the obstacles may be measured and maintained by the imaging system. In scenarios when the distance from obstacles 220 overlaps with the distance from other obstacles (because the obstacles are close together), the control system may group the obstacles 220 and assign a threshold distance to the group of obstacles. Similarly, the user input for distance from obstacles 220 may include an obstacle density, wherein the control system assigns a threshold distance of avoidance for any group of obstacles that has more obstacles in proximity to one another than a predetermined density threshold. Thereby, when the control system receives user input indicating a density threshold (such as by selecting the "density avoidance" priority, as illustrated in FIGS. 6A-B), the path planner is biased to plan toward less obstacle-dense regions and to avoid an entire group of obstacles. Thus, when optimizing for density avoidance based on obstacle density, the path planner is configured to prioritize going around a densely populated area over going through it, even if it is a longer or more energy-inefficient route. The system may be configured with a threshold object density for designating an area to be avoided when the density avoidance priority is selected. Alternatively, the system may enable the use to select or input a density or to otherwise designate a dense area to be avoided, such as by providing touch input on the display device showing a map of the marine navigation area. The control system may use images received from the image sensors to determine the density of groups of obstacles within the marine navigation area. In one embodiment, obstacle density is determined based on the number of discrete objects within some predefined distance from the planned path, or by a ratio of occupied to unoccupied cells in an occupancy grid within a predefined distance of the planned pathway.

Another selectable priority for path planning may include minimizing travel time, wherein the prioritized navigation pathway is defined to minimize the time it takes to travel between the vessel location 115 and the navigation target location 110. This may include identifying the shortest path and/or the path that enables the fastest average vessel speed, such as minimizing turn points 154.

Another selectable priority for path planning may include energy efficiency, wherein the prioritized navigation pathway 200 is defined to prioritize energy efficiency of at least one marine drive while propelling the vessel between the vessel location 115 and the navigation target location 110. Thus, the route is planned to minimize fuel or battery power utilization, such as to maximize TTE and DTE values. This may be the shortest route that also avoids having to execute inefficient thrust maneuvers. When prioritizing energy efficiency, the control system may account for the orientation of the vessel location 115 compared to the orientation of the navigation target location 110 and define the prioritized navigation pathway 200 with an orientation that maximizes the amount of time the marine vessel is moving forwards or backwards, as opposed to laterally. Lateral and rotational movement is less efficient than surge movement because it requires thrust vector cancellation, and thus generation of thrust output by the marine drive(s) that is not translated into vessel movement.

Additionally or alternatively, the selectable priorities for path planning may include prioritization selection(s) related to user experience, such as correlated with one or more propulsion control commands comprising part of the navigation pathway and/or the execution thereof by the propulsion control system. As an example, one selectable priority for defining the prioritized navigation pathway may be a "comfort level", wherein a selection of a prioritized "comfort level" is associated with a low maximum acceleration (and deceleration) magnitude, an increased buffer distance from obstacles 220, and/or a maximum threshold vessel speed, among other potential values for path planning and propulsion control that maximize ride comfort.

Additionally or alternatively, the system may be configured to present a selectable priority relating to accommodation of environmental disturbances, such as wind, current, and/or waves. The control system may be configured to, in response to identification of the environmental accommodation factor, identify and display a prioritized navigation pathway based on at least one environmental vector describing a magnitude and direction of at least one environmental disturbance within the marine navigation area. For example, the control system may be configured to account for the environmental disturbance by adjusting an environmental map of the marine navigation area based on the direction and magnitude of the environmental disturbance, such as to adjust the size and/or locations of objects and/or cell weights of an occupancy grid or other stored environment map. The environmental map used for plotting the navigation pathway is adjusted to facilitate maintaining an avoidance distance in an avoidance direction with respect to the marine vessel based on the magnitude and direction of the environmental vector.

Upon generating the display image 120 and displaying the display image 120 on the user interface display 117, the control system may prompt a user to confirm or adjust the navigation pathway—e.g., select that the prioritized navigation pathway 200 (based off the received selection of at least one selectable priority) be entered as the pathway for navigation control or, if the prioritized navigation pathway 200 is suboptimal or inadequate, select at least one additional selectable priority for replanning the navigation pathway.

As illustrated in FIGS. 6A-6B, the system may be configured to facilitate user input comprising the selection of one or a plurality of selectable priorities 210 for path planning. The control system then defines the prioritization navigation pathway based on the two or more selectable priorities 210 for path planning, where the control system weights parameters associated with the selected priorities, adjusts the environment map based on the selected priorities, and/or selects and executes a path planning algorithm configured to optimize for the selected priorities. In one embodiment, the control system may be configured to facilitate or force the user to input a prioritization ranking of selected priorities such that the selectable priorities 210 are prioritized or ranked in comparison to the other selected priorities. Thus, within the selected two or more selectable priorities 210, one of the selectable priorities 210 may be identified by the user input as the most important or highest priority for defining the prioritized navigation pathway. The system is then configured to arbitrate pathway selections in favor of the highest-ranked priority. Alternatively, the system may be configured with a predetermined priority ranking for all of the possible selected priorities. The control system may be configured with arbitration algorithms and thresholds for mediating between parameters based on the selected or predetermined rankings. For example, where a user provides input selecting time to target as the highest priority and distance around obstacles as a second priority, the control system may be configured to plan the path to accommodate the avoidance distance provided that it does not add more than a threshold amount of additional time to the route compared to the quickest route possible, and may be configured to increase the planned vessel speed in view of the greater distance from obstacles. However, where the control system cannot arrive on a path that accommodates the threshold avoidance distance without adding more than the threshold time to the route, then the path selection algorithm will favor a path that stays within the time threshold. For example, the threshold time may be a percentage of the quickest possible path (e.g., 110% or 120%), or in other examples may be a threshold amount of time (e.g., 2 minutes or 5 minutes). Conversely, where the user selects distance around obstacles as the highest priority, the control system may be configured to favor a path that maintains at least the threshold distance regardless of the amount of time added.

In certain embodiments, the system may be configured to enable equal prioritization of certain selectable priorities where satisfaction of both factors is possible and algorithmically feasible. Thus, the system may be configured to permit two or more selected priorities 210 the user to select priorities that are prioritized together, such as prioritizing both a minimal time to target and shortest distance or both comfort and a clearance distance from obstacles.

In at least one embodiment, the control system may be configured to limit the number of priorities that a user can select for path planning. Selection of too many priorities for path planning to the control system may yield no feasible prioritized navigation pathway that satisfies all selected priorities.

The system may be further configured to prevent user selection of conflicting priorities for path planning. For example, where two priorities optimize for conflicting parameters and thus cannot both be sufficiently accounted for together, the user interface may be configured and controlled to disallow selection of conflicting priorities and only allow user selection of one or the other of the conflicting priorities. Thus, selection of one selectable priority 210 may prevent the selection of another selectable priority 211. Similarly, the system may be configured such that selection of a certain combination of selectable priorities prevents the selection of another selectable priority. Referring now to FIG. 6B, when one priority is selected, the control system may modify the user interface display to disallow selection of any priority or priorities that conflict with the selected priority. As an example, the selection of time to target as a selectable priority may preclude the selection of a limited speed threshold as a second selectable priority. Similarly, this limitation may apply to a selection of two or more selectable priorities for path planning, wherein a combination of selected priorities may preclude the selection of another selectable priority 211, such as selecting a priority for a comfort level and energy efficiency, which may preclude the selection of minimizing the time to target as a priority for the prioritized navigation pathway. The unavailability of selectable priorities 211 may be indicated on the user interface display 117 by, for example, greying out the selection button and disabling any response by the user interface to touch input in the area of the selection button.

Figure 7:
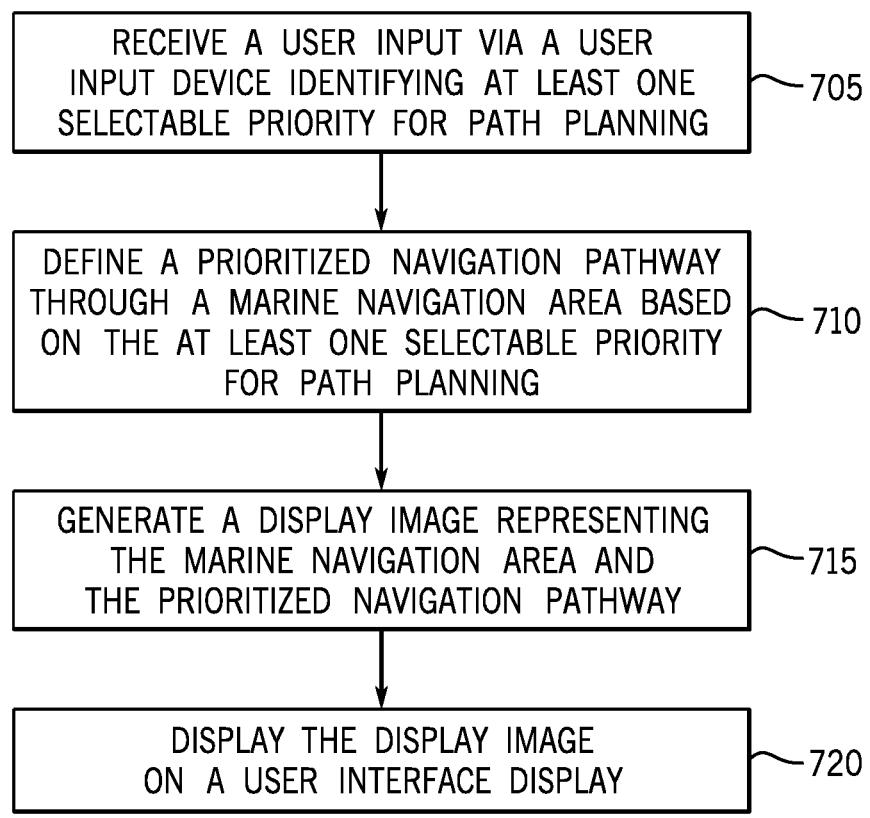
FIGS. 7-8 illustrate exemplary methods for controlling navigation for a marine vessel in accordance with embodiments of the present disclosure.

FIG. 7 illustrates an exemplary method for controlling docking for a marine vessel. At 705, a user input is received by the control system via a user input device that identifies at least one selectable priority for path planning. In some embodiments, the system may be configured to generate and present a user interface display showing a plurality of priorities for path planning that are each user selectable. Selectable priorities may include, for example, an acceleration maximum, a distance from obstacles, including a threshold distance from any obstacle, minimizing travel time, and energy efficiency. At 710, a prioritized navigation pathway through a marine navigation area is defined by the control system based on the at least one selected priority for path planning. At 715, a display image representing the marine navigation area and the prioritized navigation pathway is generated by the control system. At 720, the display image is displayed by the control system on a display device.

Figure 8:
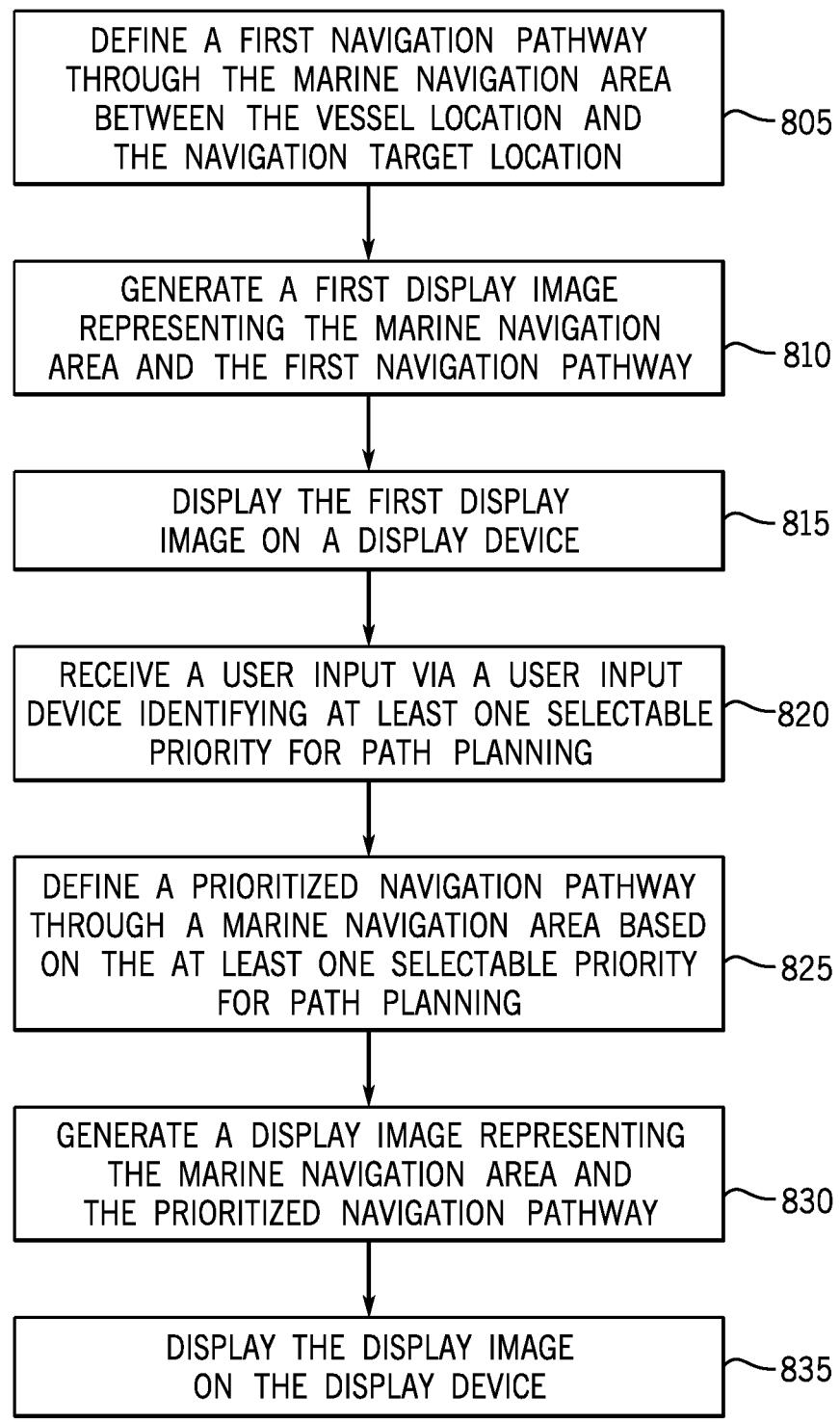

FIG. 8 illustrates another exemplary method for controlling navigation for a marine vessel. At 805, a first navigation pathway through a marine navigation area between the current global position of the vessel and a target location is defined by the control system. The first navigation pathway may include a first set of geographical locations extending in a first direction from the vessel location towards the navigation target location. For example, the first navigation pathway may be generated by the control system based on a default set of priorities. Alternatively, the first navigation pathway may be a first prioritized navigation pathway determined based on a first set of one or more user-selected priorities for path planning. At 810, a first display representing the marine navigation area and the first navigation pathway is generated by the control system. At 815, the first display image is displayed on a display device.

Where the user desires to modify the first navigation pathway, the user may provide input to modify the navigation pathway. The control system may operate the user interface to present a plurality of selectable priorities for path planning and configured to facilitate the user to input different priorities than those utilized for planning the first navigation pathway. At 820, a user input is received by the control system via a user input device identifying at least one selectable priority for path planning. For example, where the display device is a touchscreen, the user input may be received via touch input on the display device. As described above, the user interface may be controlled to facilitate user input selecting a plurality of priorities for path planning, and in some embodiments, the user interface display provided on the display device is configured to facilitate the user input of a prioritization ranking of priorities. Alternatively or additionally, the control system may operate the user interface display to disallow user selection of more than a predetermined number of priorities and/or to disallow selection of conflicting priorities.

At 825, a prioritized navigation pathway through a marine navigation area is defined based on the at least one selectable priority for path planning. At 830, a display image is generated by the control system representing the marine navigation area and the prioritized navigation pathway. At 835, the display image is displayed by the control system on the display device. Upon displaying the prioritized navigation pathway, the control system may generate prompt on the user interface display for confirmation or selection of at least one additional or different selectable priority for path planning. Once user input is received by the control system accepting the adjusted navigation pathway, the navigation controller may begin controlling propulsion of the marine vessel such that it follows the adjusted navigation pathway.

This written description uses examples to disclose the invention, including the best mode, and to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed.

What is claimed is:

1. A method of controlling navigation for a marine vessel, the method comprising:
  receiving a user input via a user input device identifying at least one selectable priority for path planning;
  defining a prioritized navigation pathway through a marine navigation area based on the at least one selectable priority for path planning indicated by the user input between a vessel location and a navigation target location;
  generating a display image representing the marine navigation area and the prioritized navigation pathway; and
  displaying the display image on a display device.

2. The method of claim 1, wherein the at least one selectable priority for path planning includes an acceleration maximum, wherein the acceleration maximum defines an acceleration limit of the marine vessel and/or at least one marine drive on the marine vessel; and
  wherein the prioritized navigation pathway is defined such that the acceleration maximum is not exceeded.

3. The method of claim 1, wherein the at least one selectable priority for path planning includes a distance from obstacles, wherein the prioritized navigation pathway is defined such that the vessel remains at least a threshold distance from any obstacle.

4. The method of claim 3, wherein the user input specifies the threshold distance.

5. The method of claim 1, wherein the at least one selectable priority for path planning includes minimizing travel time, wherein the prioritized navigation pathway is defined to minimize the time it takes to travel between the vessel location and the navigation target location.

6. The method of claim 1, wherein the at least one selectable priority for path planning includes energy efficiency, wherein the prioritized navigation pathway is defined to prioritize energy efficiency of at least one marine drive while propelling the vessel between the vessel location and the navigation target location.

7. The method of claim 1, further comprising, upon generating the display image and displaying the display image on the display device, prompting a user to confirm the prioritized navigation pathway or select at least one additional selectable priority for path planning.

8. The method of claim 1, wherein a user input identifies two or more selectable priorities for path planning.

9. The method of claim 8, wherein the two or more selectable priorities are prioritized and the prioritized navigation pathway is defined based on the prioritization of the two or more selectable priorities for path planning.

10. The method of claim 8, further comprising determining that the number of selected priorities for path planning are fewer than a selected priorities threshold prior to defining the prioritized navigation pathway, wherein the selected priorities threshold includes a limit on how many selectable priorities for path planning may be included in the user input.

11. The method of claim 1, further comprising:
defining a first navigation pathway through the marine navigation area between the vessel location and the navigation target location, wherein the first navigation pathway includes a first set of geographical locations extending in a first direction from the vessel location towards the navigation target location;
generating a first display image representing the marine navigation area and the first navigation pathway and displaying the first display image on the display device; and
wherein the at least one selectable priority for path planning inputted by a user indicates a different direction than the first direction such that the prioritized navigation pathway extends in a different direction with respect to the vessel location than the first direction.

12. The method of claim 1, further comprising controlling a marine drive to propel the marine vessel based on the navigation pathway.

13. A navigation system for a marine vessel, the system comprising:
a display device on the marine vessel;
a control system configured to:
receive a user input via a user input device identifying at least one selectable priority for path planning;
define a prioritized navigation pathway through a marine navigation area based on the at least one selectable priority for path planning indicated by the user input between a vessel location and a navigation target location;
generate a display image representing the marine navigation area and the prioritized navigation pathway; and
display the display image on the display device.

14. The system of claim 13, wherein the at least one selectable priority for path planning includes an acceleration maximum, wherein the acceleration maximum defines an acceleration limit of the marine vessel and/or at least one marine drive on the marine vessel; and
wherein the prioritized navigation pathway is defined such that the acceleration maximum is not exceeded.

15. The system of claim 13, wherein the at least one selectable priority for path planning includes a distance from obstacles, wherein the prioritized navigation pathway is defined such that the vessel remains at least a threshold distance from any obstacle.

16. The system of claim 15, wherein the user input specifies the threshold distance.

17. The system of claim 13, wherein the at least one selectable priority for path planning includes minimizing travel time, wherein the prioritized navigation pathway is defined to minimize the time it takes to travel between the vessel location and the navigation target location.

18. The system of claim 13, wherein the at least one selectable priority for path planning includes energy efficiency, wherein the prioritized navigation pathway is defined to prioritize energy efficiency of at least one marine drive while propelling the vessel between the vessel location and the navigation target location.

19. The system of claim 13, wherein the control system is further configured to, upon generating the display image and displaying the display image on the display device, prompt a user to confirm the prioritized navigation pathway or select at least one additional selectable priority for path planning.

20. The system of claim 13, wherein a user input identifies two or more selectable priorities for path planning.

21. The system of claim 20, wherein the two or more selectable priorities are prioritized and the prioritized navigation pathway is defined based on the prioritization of the two or more selectable priorities for path planning.

22. The system of claim 20, wherein the control system is further configured to, determine that the number of selected priorities for path planning are fewer than a selected priorities threshold prior to defining the prioritized navigation pathway, wherein the selected priorities threshold includes a limit on how many selectable priorities for path planning may be included in the user input.

23. The system of claim 22, wherein a selection of two or more selectable priorities for path planning prevents the selection of at least one other selectable priority for path planning.

* * * * *